United States Patent
Purser (12)

(10) Patent No.: US 6,319,527 B1
(45) Date of Patent: Nov. 20, 2001

(54) METHOD OF PREPARING A UNIFORMLY TENDER MEAT PRODUCT

(75) Inventor: David E. Purser, San Antonio, TX (US)

(73) Assignee: Distinctive Brands, Inc., Boulder, CO (US)

( * ) Notice: Subject to any disclaimer, the term of this patent is extended or adjusted under 35 U.S.C. 154(b) by 0 days.

(21) Appl. No.: 09/427,524

(22) Filed: Oct. 26, 1999

(51) Int. Cl.$^7$ .................................................. A23C 9/12
(52) U.S. Cl. .................... 426/63; 426/641; 426/652; 426/523
(58) Field of Search ................... 426/56, 641, 509, 426/510, 410, 63, 652, 523

(56) References Cited

U.S. PATENT DOCUMENTS

| | | |
|---|---|---|
| 3,188,213 | 6/1965 | Delaney . |
| 3,360,382 * | 12/1967 | Miller ................................. 426/316 |
| 3,600,198 * | 8/1971 | Gonthier et al. ..................... 426/335 |
| 4,239,785 * | 12/1980 | Roth .................................... 426/266 |
| 4,313,963 | 2/1982 | Greenspan . |
| 4,675,947 * | 6/1987 | Clatfelter et al. .................... 426/416 |
| 4,851,241 | 7/1989 | Tsuji et al. . |
| 4,940,590 * | 7/1990 | Williams et al. ..................... 426/92 |
| 5,298,270 * | 3/1994 | Morgan ............................... 426/234 |
| 5,512,015 * | 4/1996 | Teran ................................... 452/145 |
| 5,693,350 | 12/1997 | Fernandez et al. . |
| 5,736,186 * | 4/1998 | Holdren et al. ....................... 426/646 |
| 5,744,246 * | 4/1998 | Ching .................................. 428/474.4 |
| 5,948,457 | 9/1999 | Deyo et al. . |

FOREIGN PATENT DOCUMENTS

| | | | |
|---|---|---|---|
| 0 031 630 A1 | 7/1981 | (EP) . | |
| 0 669 084 A1 | 8/1995 | (EP) . | |
| 0174801 * | 3/1986 | (EP) | ............................ A23L/1/318 |
| 2 295 761 A | 6/1996 | (GB) . | |
| 3-019646 | 1/1991 | (JP) . | |
| 11-243921 | 9/1999 | (JP) . | |
| 403019646 * | 1/1991 | (JP) | ................................ A23B/4/03 |
| 406277007 * | 10/1994 | (JP) | ................................ A23L/1/317 |

* cited by examiner

Primary Examiner—Nina Bhat
(74) Attorney, Agent, or Firm—Jenkens & Gilchrist, A Professional Corporation

(57) ABSTRACT

A method of preparing a uniformly tender meat product having an extended shelf life comprises the steps of selecting one or more meat ingredients wherein the muscle weight is comprised of whole protein tissue fibers, such as beef or pork, and mixing an acidulent with the meat to form a pretenderized meat product. Subsequently, the pretenderized meat product is mixed with an enzymatic tenderizer and cooked. The finished product is typically packaged in an oxygen-impermeable film, which also contains a microbe-inhibiting atmosphere and an oxygen-moisture scavenging agent.

25 Claims, 1 Drawing Sheet

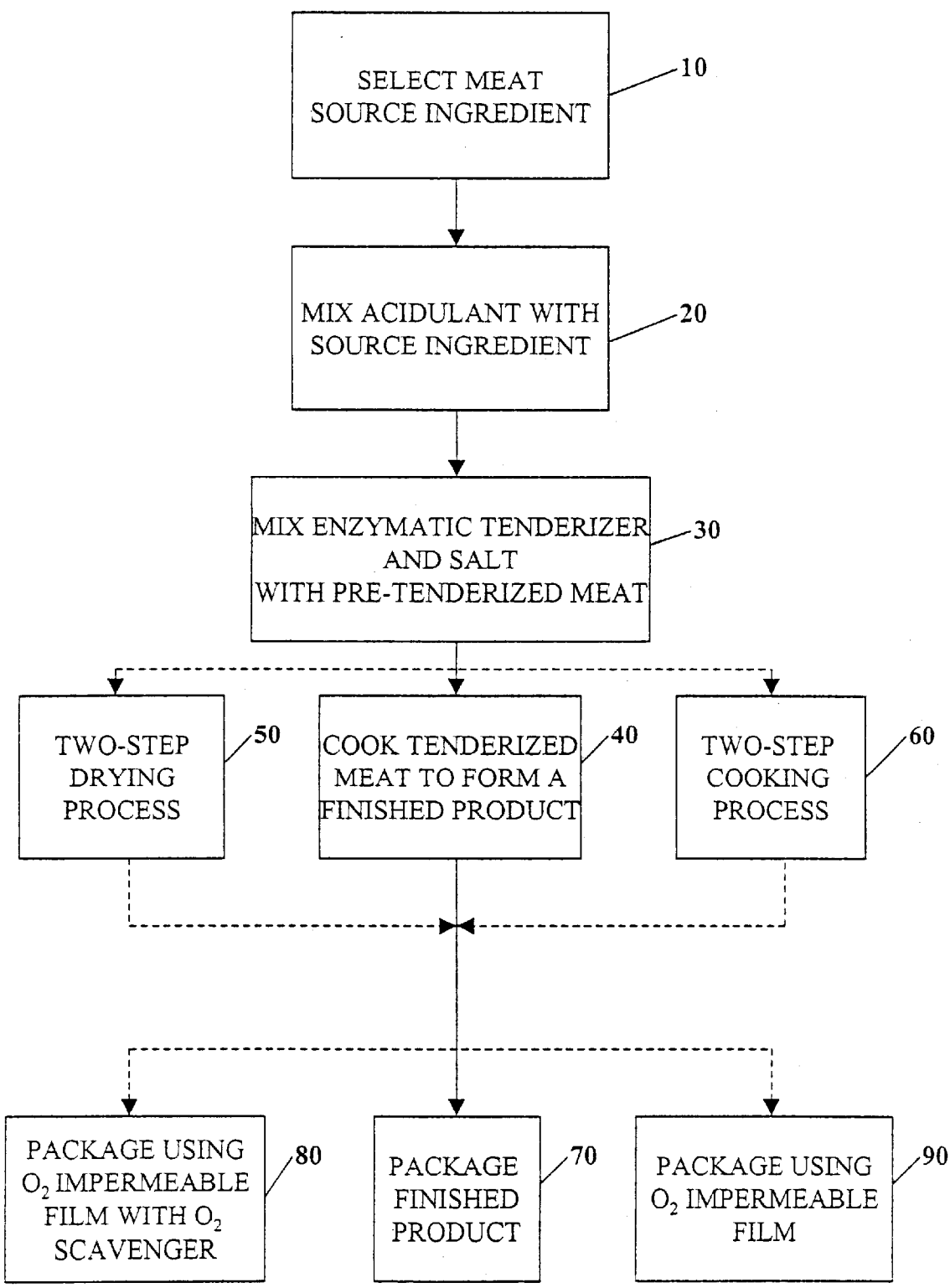

METHOD OF PREPARING A UNIFORMLY TENDER MEAT PRODUCT

BACKGROUND OF THE INVENTION

1. Field of The Invention

This invention relates to a method for preparing a uniformly tender meat product having an extended shelf life. More particularly, this invention relates to a method whereby the resulting uniformly tender meat product with an extended shelf life is produced using a combination of acid treatment and a tenderizing enzyme.

2. History of the Related Art

Naturally prepared jerky, also known as charqui, is typically made with strips of lean animal tissue having distinct muscle striation. The natural toughness of the product is enhanced by using muscle tissue with a significant whole protein tissue fiber content. In addition, most of the factors which contribute to tenderness, or the lack thereof, such as the anatomical location of muscle within the animal, product freshness, moisture content, fat content, animal age, etc. are not easily controlled. Thus, a significant amount of time and care is required to prepare whole muscle natural jerky which, in most cases, lacks consistent tenderness.

Further, current methods provide an inconsistently tender product due to the inconsistent application of tenderizing adjuncts. The protein structure of meat is such that the application of tenderizer using conventional tumbling or soaking processes will result in an end product which is overly-tender in some areas, while remaining rather tough in others. Until the tenderizer begins to act on the outer muscle fibers, many of the inner fibers remain closed to the tenderizing activity.

Jerky products are also less than satisfactory with respect to several other aspects. Attempts to produce a jerky-like product utilizing less expensive protein sources have been made. Such methods produce a jerky that is often tough or crumbly. In addition, if the product is made from restructured, sectioned meat particles, the end result appears to be artificial, with a "plastic" appearance. Consumers are reluctant to purchase a product that is so obviously machine-made, and does not have the distinct, rugged appearance of natural fibrous whole muscle jerky.

Finally, unless significant amounts of preservative are added, typical jerky products have a very limited shelf life. Consumers are reluctant to purchase meat products having a high concentration of synthetic chemical additives, and preference is given to those products using all-natural ingredients.

Thus, what is needed, is a process for preparing a uniformly tender meat product which is easily implemented using currently-available machinery and cooking methods, along with readily available ingredients. Given consumer preferences, the process should make use of natural ingredients wherever possible, especially with respect to enhancing shelf life. Further, the process should not be prohibitively expensive to implement, such that a commercially viable product results.

SUMMARY OF THE INVENTION

A method of preparing a uniformly tender meat product having an extended shelf life comprises the steps of selecting a meat ingredient having some amount of whole protein tissue fiber content as a source ingredient, mixing an acidulent with the source ingredient to form a pre-tenderized product, mixing an enzymatic tenderizer with the pre-tenderized product to form a tenderized meat product, and cooking the tenderized meat product to form a finished product. The invention also includes the product produced by this method.

The shelf life of the product is enhanced by the initial application of the acidulent, which acts to shock pathogenic and spoilage bacteria. However, the shelf life may be further extended by packaging the finished product in an oxygen-impermeable polymeric film. Further, the packaging step may include surrounding the finished product with a microbe-inhibiting atmosphere, such as nitrogen, and including an oxygen-moisture scavenging agent, such as iron and silica containing materials, within the package. Shelf life is further extended by cooking the tenderized meat product at temperatures above about 150° F. to provide a finished product which has a water activity of less than about 85%.

There are several methods of mixing which may be employed including using a vacuum tumbler operating at a pressure of about 20 psi and turning about 9 to 20 rpm for a time period of about 5 to about 30 minutes. Of course, other mixing methods may be used. The cooking step may include a two-step drying process: first drying the tenderized meat product at a temperature of about 145° F. for about 15 minutes, and then drying the tenderized meat product at a temperature of about 150° F. for about 15 minutes. Alternatively, the cooking step may be characterized by cooking the tenderized meat product at a dry bulb temperature of about 160° F. and a wet bulb temperature of about 145° F. until the tenderized meat product reaches an internal temperature of about 150° F., and then steam cooking the tenderized meat product at a temperatures of about 170° F. until the tenderized meat product reaches an internal temperature of about 160° F.

The resulting product is uniformly tender, and according to laboratory testing of other products in the industry, demonstrates a more consistent and greater degree of tenderness than other products currently available. Standard manufacturing equipment can be used to implement the instant process, and readily available ingredients are used to provide a uniformly tender product having an enhanced shelf life, if desired.

BRIEF DESCRIPTION OF THE DRAWING

A more complete understanding of the structure and operation of the present invention may be had by reference to the following detailed description when taken in conjunction with the accompanying drawing, wherein the figure is an expanded method flow chart for processing meat and other ingredients to provide a uniformly tender, enhanced shelf life meat product.

DETAILED DESCRIPTION OF THE PREFERRED EMBODIMENT

The method of the present invention acts to transform whole protein muscle, striated, fibrous raw meat material into a consistently tender, jerky product using acidulents and an enzymatic tenderizer. The finished product does not have the characteristics of a sectioned, formed, or extruded product. Rather, the final product is more tender than jerky products currently manufactured, and has a greater degree of consistency (i.e., less deviation from a selected amount of tenderness).

Turning now to the figure, a more detailed view of the process of the present invention can be seen. In step 10, one or more meat ingredients are selected as a source ingredient for processing. Meat products of various species comprised of, but not limited to, fleshy tissue from beef, pork, fowl, ostrich, fish, antelope, bison, deer, elk, shellfish and other seafood are suitable. Meat is that part of generally clean flesh derived from slaughtered animals which is striated with whole muscle taken from skeletal portions. Any muscle tissue portions derived from meat and meat byproducts can generally be employed using the process described herein as long as a consistent amount of fibrous muscle tissue is present.

The meat selected in the step 10 may be any type that is suitable for human consumption. The meat may be non-rendered, non-dried, raw, and even comprise mixtures of whole muscle formulations. Whole meat pieces should be fresh, although frozen or semi-frozen forms may also be used. Since freezing affects the tenderness of meat by rupturing intrafibrillar tissue due to ice crystal formation, the increased tenderness resulting from freezing must be taken into account when using such products in the process described herein.

Generally, it is preferable to have at least about 5% of the weight of the muscle comprised of whole protein tissue fibers. It is most preferable to have at least about 10% to about 90% of the muscle weight comprised of whole protein tissue fibers, since salt-soluble proteins can be extracted therefrom to soften the fibers, providing a tender result even when large diameter fibers are present. Fat content is preferably less than about 30%, and most preferably less than about 15%, to promote efficient use of adjuncts.

The most preferred type of meat is denuded (i.e., the exterior portion of collagen tissue is removed), USDA select and standard grade bottom rounds, top, and eye of rounds. Typically, the selected meat source ingredient (one or more meat products in combination) are visually inspected to confirm texture and overall condition of the product. Hand-trimming of the denuded portion may be required. The source ingredient is then sliced into suitable pieces, typically 5 to 20 mm thick, with random lengths. The slicing apparatus may be identical to or similar to a Carruthers 2D Autoslicer model No. AS5100.

At step 20, an acidulent is mixed with the selected source ingredient. The preferred mixing method of step 20 simply involves the addition of an acidulent to the source ingredient within a vacuum tumbler. For the purposes of this invention, an "acidulent" is defined to be an ingredient similar to, or identical to the following acids: adipic acid, aconitic acid, ascorbic acid, calcium phosphate monobasic monohydrate, caprylic acid, calcium stearate, calcium citrate, citric acid, cyclamic acid, gluconic acid, fumaric acid, malic acid, tartaric acid, succinic acid, sodium aluminum phosphate acid, sodium bisulfate, sodium succinate, sorbic acid, sulfuric acid, lactic acid, phosphoric acid, linoleic acid, or any other suitable generally recognized Food Grade Acid Generally Recognized As Safe (GRAS) components.

The source ingredient is typically combined with the acidulent and tumbled in a vacuum tumbler having inner baffles, which rotates the ingredients; picking them up and dropping them repeatedly. Other types of mixing equipment may be used. The massaging action of the mixer or tumbler loosens the connective tissue within the meat and ensures a deeper and more consistent penetration of the enzymatic tenderizer, which is added in the next step. The physical contact between the acid and the source ingredient allows activation of proteins within the meat by opening the fibers for more effective penetration of the tenderizing enzyme and salt, if used. Further, the acid contact promotes a lower initial microbial count, with a resultant enhanced shelf life end-product. Initial disassociation of acids results in the rapid destruction of microflora; the acidic pH shocks pathogenic and spoilage bacteria and greatly reduces their numbers. The acidulent mixing step 20 typically occurs within a vacuum tumbler at a pressure of about 20 psi, at a rate of about 9 to about 20 revolutions per minute, for about 5 to about 30 minutes.

It is important to maintain the pH of the source ingredient within a range of about 4.0 to about 9.0, and most preferably, at a pH of greater than about 5.4 throughout the process. Thus, the amount of acidulent and other ingredients added to the source ingredient should be carefully monitored. For example, 100 kilograms of raw, sliced beef typically requires about 0.3 kg by gravimetric weight of acidulent, such as citric acid, to properly pre-tenderize the source ingredient.

In step 30, the pre-tenderized meat product is subsequently mixed with an enzymatic tenderizer and salt, if desired, to form a tenderized meat product. Suitable enzymatic tenderizers can be identical to, or similar to, bromelin (derived from pineapple), ficin (derived from figs), or papain (derived from papaya). Tenderizer may be applied in solid, powdered, or liquid form. For example, 100 kilograms of pre-tenderized beef product typically requires about 10 ml of 200 MCU/gm min. concentrated liquid papain, or about 0.0001% to about 3% of powdered bromelin or ficin. Other enzymatic tenderizers which may be used include: Bromelin 1:10, Bromelin 150 GDU, Bromelin 600 GDU, Bromelin 1200 GDU, Bromelin 1500 GDU, Bromelin Conc., Brosoft6430, Amylase, Fungal Protease, Fungal Protease 31,000, Fungal Protease 60,000, Fungal Protease 500,000, Fungal Protease Conc., Liquipanol™, Papain 16,000, Papain 30,000, Papain A300, Papain A400, Papain Conc., Papain M70, Papain P-100, Papain S 100, Protoferm, Rhozyme® P11, magnesium chloride. Consumers prefer natural tenderizers, such as those just described. However, synthetic tenderizers may also be used. For example, suitable synthetic enzymatic tenderizers may include: Hodag GMSH, Kena® FP-28, Nutricol® Konjac, Tenderbite SF(TB-SF), Ticaloid® 1039, Tona Enyme 201, Tona Papain 14, Tona Papain 90L, Tona Papain 270L, Viscarin® ME-389, Viscarin® XP-3160, and Vitrafos®.

The enzymatic tenderizer is also typically mixed with the pre-tenderized meat product and salt in a vacuum tumbler. The tumbling cycle lasts at least about 5 minutes, and preferably, at least about 20 minutes and should be conducted at temperatures below about 46° F. The enzymes are most effective, as mentioned above, when the pH range of the pre-tenderized meat products is between about 4.0 to about 9.0, and the temperature is held below about 46° F. The addition of salt acts to buffer the mixture and de-activate the acidulent. Temperature during tumbling should be greater than about 30° F. to prevent the meat from freezing.

Once the pre-tenderized meat has been mixed with the enzymatic tenderizer at step 30, the tenderized meat product which is formed can thereby be cooked. This occurs at step 40, where a finished product is formed.

Several methods of cooking may be employed. For example, the tenderized meat product may be removed from the tumbler and placed on cooking screens. Typically, these screens are placed in multiples on a rack and setwithin a smokehouse or cooking oven. The salt-soluble proteins extracted from the source ingredient will begin to cook at temperatures of about 149° F., or greater. The cooking process acts to seal in added moisture and to create a steam jacket, because the solubilized meat protein forms a matrix with water molecules surrounding its structure. This multi-sided molecule, upon heating, cooks with the surface moisture acting as a steam pressure cooker. The more protein that can be extracted, the more moisture that is bound and consequently, the better use that is made of the heat in converting moisture to steam, producing a more tender product. The finished product that results is more tender than conventional whole muscle beefjerky cooked in a similar fashion, and has an attractive mahogany smoked-meat coloring. Cooking may be employed over a variety of temperatures, up to a temperature of about 300° F. However, the activation of the tenderizing enzyme begins at about 80° F. and extends up to about 176° F., and most preferably, within a range of about 149° F. to about 176° F. Cooking within this heat range allows tenderizing to continue during the entire cooking process.

As indicated at step 50, a two-step drying process may also be used to cook the tenderized meat product. In the first step, the smokehouse or oven dampers are closed, so that no humidity is added to the product. This allows the product to reach a temperature suitable for rapid and efficient surface drying, which occurs during the second step. In the first step, moisture evaporation from the surface of the product actually cools the product. Surface drying begins with cooking at temperatures of greater than about 145° F. for a period of at least about 15 minutes. The second drying step requires cooking for at least about 15 minutes at temperatures of greater than about 150° F. Liquid smoke may then be applied to the product, which requires more drying. However, wood chip smoke may also be used, and subjecting the tenderized product to a dry bulb temperature of 155° F. (with a wet bulb temperature of 125° F.) will continue drying the meat surface and promote smoke adhesion.

As shown in step 60, it is also possible to use a two-step cooking process which employs core temperature control, rather than time. However, the amount of energy imparted to the finished product must still be minimized until a protein skin forms. As the protein dries and the moisture surrounding each molecule evaporates, the raw protein begins to denature (bonded amino acids break apart) and coagulate due to the applied dry heat. Drying and heating the protein will cause it to form a durable surface skin that insulates and protects the internal layers of protein from further drying. The hardened skin helps to protect the meat from a complete loss of moisture as well as provide chewy textural sensory aspects. Skin formation is also responsible for much of the color change that allows smoked meats to darken and exhibit a suitable smoked color. The initial phase of temperature during cooking, using lower humidity available within the oven (the wet bulb description of a smoke house or food cooking oven), allows the meat temperature to be maintained below about 120° F. and will result in this skin formation.

Initially, a dry bulb temperature of greater than about 160° F. (and a wet bulb temperature of greater than about 145° F.) is maintained until the internal temperature of the product reaches about 150° F. The cooking temperature should be maintained for at least 5 minutes and preferably, at least about 15 minutes, to insure that microbial pathogens are killed and that the end product will be shelf-stable. Most preferably, beef products should be cooked to an internal temperature of greater than about 145° F. for at least about ten or fifteen minutes. Thereafter, steam cooking is used to raise the internal temperature to about 160° F., using a steam temperature of greater than about 170° F. Pork and poultry products should be heated to an internal temperature of greater than about 165° F.

The shelf life of the finished product may be further enhanced by measuring the amount of water activity, which is the measure of free water (available as moisture to be used by other cells, such as bacteria, since it is not bound at the molecular level) within the meat. It is preferred that samples of the finished product exhibit a water activity of about 85%, or less. If this level of water activity is achieved, the product will not possess enough free, unbound moisture to support microbial growth after packaging.

The finished product may then be sliced into small pieces, such as about 2 cm square, weighed, and packaged in pouches at step 70. Further enhancement of shelf life may be obtained by using an oxygen impermeable film for packaging, as is shown at step 90. In addition, the finished product may be surrounded with a microbe-inhibiting atmosphere, such as nitrogen, and an oxygen-moisture scavenging agent, such as iron or silica gel, may be placed within the package with the finished product, as is shown in step 80. Most preferably, the finished product is packaged using a microbe-inhibiting atmosphere, an oxygen-moisture scavenging agent, and an oxygen impermeable film in combination.

The process described herein produces a uniformly tender meat product having an enhanced shelf life. The tenderness of the final product has been verified through laboratory testing using a Warner-Bratzler analog gauge, or a digital force gauge, such as that manufactured by the Chatillion Company, Model WSI630. Uniform pieces of flat jerky, about 2 cm×2 cm, were cut and tested on the shear force testing machine. Modified blades, 5 cm×1 mm thick, made of stainless steel and cut at a quarter-bevel were used to shear the meat jerky final-product samples. The 2 cm wide, 0.50 cm thick portions of whole muscle jerky were sheared in a direction perpendicular to the longitudinal orientation of the muscle fibers. A minimum of six samples were tested for each variety. The results of the testing are shown in the table below.

| Company | Variety | Average Shear Force in kilograms | Standard Deviation in kilograms |
| --- | --- | --- | --- |
| 1 | 1 | 18.8 | 6.1 |
| 2 | 1 | 33.7 | 6.9 |
| 2 | 2 | 61.6 | 12.3 |
| 3 | 1 | 63.6 | 19.7 |
| 3 | 2 | 62.8 | 17.3 |
| 4 | 1 | 24.6 | 4.5 |
| 5 | 1 | 23.3 | 7.0 |
| 6 | 1 | 25.1 | 4.9 |
| 6 | 2 | 42.4 | 8.7 |
| 7 | 1 | 49.2 | 2.9 |
| instant process | 1 | 13.3 | 2.4 |
| instant process | 2 | 22.2 | 3.7 |
| instant process | 3 | 16.3 | 3.8 |

The data indicate the resulting shear force in kilograms required for randomly selected samples from seven different commercial companies. The "instant process" company produces jerky according to the process described herein. As is evident, the average tenderness achieved (represented by the average shear force) is clearly superior to most of the other products tested. More important, the tenderness (i. e., shear force) deviation is much less with the instant process than that achieved by other, more conventional processes. Lower forces indicate a superior tenderness, since the meat is easier to shear and lower shear forces correlate to higher organoleptic acceptance.

Thus, the instant process described herein provides a uniformly tender meat product. The product also has a shelf life enhanced by lowered water activity and a carefully controlled packaging environment. Finally, the uniformly tender product can be achieved using all-natural ingredients. The ingredients used to produce a finished product are readily available, and the steps implemented in producing the finished product use machinery which is readily available at conventional manufacturing facilities.

Although the invention has been described with reference to specific embodiments, this description is not meant to be construed in a limited sense. Various modifications of the disclosed embodiments, as well as alternative embodiments of the invention will become apparent to persons skilled in the art upon reference to the disclosure herein. It is, therefore, contemplated that the appended claims will cover such modifications that fall within the scope of the invention.

What is claimed is:

1. A method of preparing a uniformly tender meat product having an extended shelf life comprising the steps of:
   selecting one or more meat ingredients having at least about 5% of the muscle weight comprised of whole protein tissue fibers from a group consisting of beef, pork, fowl, fish, antelope, bison, deer, and elk as a source ingredient;
   first mixing together an acidulent with the source ingredient to form a pre-tenderized meat product;
   subsequently mixing together an enzymatic tenderizer with the pre-tenderized meat product to form a tenderized meat product; and
   cooking the tenderized meat product to form a finished product.

2. The method of claim 1, wherein the step of first mixing together an acidulent with a source ingredient serves to activate the proteins and lower the initial microbial count of the source ingredient.

3. The method of claim 1, wherein the step of subsequently mixing together an enzymatic tenderizer with the pre-tenderized meat product includes the step of mixing salt with the pre-tenderized meat.

4. The product produced by the method set forth in claim 1.

5. The method of claim 1, including the step of packaging the finished product using an oxygen-impermeable polymeric film.

6. The method of claim 5, wherein said packaging step includes surrounding the finished product with a microbe inhibiting atmosphere having an oxygen-moisture scavenging agent placed therein.

7. The method of claim 1, wherein the meat ingredients have from about 10% to about 90% of the muscle weight comprised of whole protein tissue fibers.

8. The method of claim 1, wherein the step of subsequently mixing together an enzymatic tenderizer with the pre-tenderized meat product to form a tenderized meat product includes the step of using a vacuum tumbler operating at a pressure of about 20 psi turning about 9 to about 20 rpm for a time period of about 5 to about 30 minutes.

9. The method of claim 1, wherein the enzymatic tenderizer is selected from a group consisting of bromelin, ficin, papain, amylase, protease, and magnesium chloride.

10. The method of claim 1, wherein the step of cooking the tenderized meat product to form a finished product is conducted at a temperature above about 149° F.

11. The method of claim 1, wherein the finished product has a water activity of less than about 85%.

12. The method of claim 1, wherein the step of cooking the tenderized meat product to form a finished product further including the steps of:
   first drying the tenderized meat product at a temperature of greater than about 145° F. for at least about 15 minutes; and
   subsequently drying the tenderized meat product at temperatures of greater than about 150° F. for at least about 15 minutes.

13. The method of claim 10, wherein the finished product has a water activity of less than about 85%.

14. The method of claim 1, wherein the step of cooking the tenderized meat product to form a finished product further includes the steps of:
   first cooking the tenderized meat product at a dry bulb temperature of greater than about 160° F. and a wet bulb temperature of greater than about 145° F. until the tenderized meat product reaches an internal temperature of about 150° F.; and
   subsequently steam cooking the tenderized meat product at temperatures of greater than about 170° F. until the tenderized meat product reaches an internal temperature of about 160° F.

15. The method of claim 12, wherein the finished product has a water activity of less than about 85%.

16. The method of claim 1, wherein the source ingredient fat content is less than about 15%.

17. A method of preparing a uniformly tender meat product having an extended shelf life comprising the steps of:
   selecting one or more meat ingredients having from about 10% to about 90% of the muscle weight comprised of whole protein tissue fibers from a group consisting of beef, pork, fowl, fish, antelope, bison, deer, and elk as a source ingredient;
   first mixing together an acidulent with the source ingredient to form a pre-tenderized meat product;
   subsequently mixing together an enzymatic tenderizer with the pre-tenderized meat product to form a tenderized meat product;
   cooking the tenderized meat product to form a finished product; and
   packaging the finished product with an oxygen-moisture scavenging agent and surrounding the finished product with a microbe inhibiting atmosphere using an oxygen-impermeable polymeric film.

18. The product produced by the method set forth in claim 17.

19. The method of claim 17, wherein the step of subsequently mixing together an enzymatic tenderizer with the pre-tenderized meat product to form a tenderized meat product includes the step of using a vacuum tumbler operating at a pressure of about 20 psi turning about 9 to about 20 rpm for a time period of about 5 to about 30 minutes.

20. The method of claim 17, wherein the enzymatic tenderizer is selected from a group consisting of bromelin, ficin, papain, amylase, protease, and magnesium chloride.

21. The method of claim 17, wherein the finished product has a water activity of less than about 85%.

22. The method of claim 17, wherein the source ingredient has a fat content of less than about 15%.

23. A method of preparing a uniformly tender meat product having an extended shelf life comprising the steps of:
   selecting one or more meat ingredients having from about 10% to about 90% of the muscle weight comprised of whole protein tissue fibers from a group consisting of beef, pork, fowl, fish, antelope, bison, deer, and elk as a source ingredient;
   first mixing together an acidulent with the source ingredient to form a pre-tenderized meat product using a vacuum tumbler operating at a pressure of about 20 psi turning about 9 to about 20 rpm for a time period of about 5 to about 30 minutes;

subsequently mixing together an enzymatic tenderizer with the pre-tenderized meat product to form a tenderized meat product;

cooking the tenderized meat product to form a finished product at a temperature above about 150° F. until the finished product has a water activity of less than about 85%; and packaging the finished product with an oxygen-moisture scavenging agent and surrounding the finished product with a microbe inhibiting atmosphere using an oxygen-impermeable polymeric film.

24. The product produced by the method set forth in claim 23.

25. The method of claim 23, wherein the source ingredient fat content is less than about 15%.

* * * * *